US011182306B2

(12) United States Patent
Moyer

(10) Patent No.: US 11,182,306 B2
(45) Date of Patent: Nov. 23, 2021

(54) DYNAMIC APPLICATION OF SOFTWARE DATA CACHING HINTS BASED ON CACHE TEST REGIONS

(71) Applicant: Advanced Micro Devices, Inc., Sunnyvale, CA (US)

(72) Inventor: Paul Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 731 days.

(21) Appl. No.: 15/359,829

(22) Filed: Nov. 23, 2016

(65) Prior Publication Data
US 2018/0143911 A1 May 24, 2018

(51) Int. Cl.
*G06F 12/123* (2016.01)
*G06F 12/0862* (2016.01)
*G06F 12/0888* (2016.01)
*G06F 12/12* (2016.01)

(52) U.S. Cl.
CPC ........ *G06F 12/123* (2013.01); *G06F 12/0862* (2013.01); *G06F 12/0888* (2013.01); *G06F 12/12* (2013.01); *G06F 2212/1016* (2013.01); *G06F 2212/502* (2013.01); *G06F 2212/6028* (2013.01)

(58) Field of Classification Search
CPC ............. G06F 12/0871; G06F 12/0862; G06F 12/0888
See application file for complete search history.

(56) References Cited

U.S. PATENT DOCUMENTS

| 6,721,856 | B1* | 4/2004 | Arimilli | G06F 12/0831 |
| | | | | 711/118 |
| 7,093,073 | B2 | 8/2006 | Truty | |
| 7,603,526 | B2 | 10/2009 | Vanstee et al. | |
| 8,683,135 | B2 | 3/2014 | Frank | |
| 9,274,582 | B2 | 1/2016 | Ferren et al. | |
| 9,390,018 | B2 | 12/2016 | McCauley et al. | |
| 9,798,665 | B1* | 10/2017 | Yochai | G06F 12/0833 |
| 2005/0195635 | A1* | 9/2005 | Conley | G06F 12/0862 |
| | | | | 365/149 |
| 2007/0067611 | A1 | 3/2007 | Ferren et al. | |
| 2007/0088915 | A1* | 4/2007 | Archambault | G06F 8/4442 |
| | | | | 711/137 |
| 2008/0104325 | A1* | 5/2008 | Narad | G06F 12/0862 |
| | | | | 711/122 |

(Continued)

OTHER PUBLICATIONS

International Search Report and Written Opinion of the International Searching Authority dated Feb. 19, 2018 for PCT Application No. PCT/US2017/062944, 13 pages.

(Continued)

*Primary Examiner* — Edward J Dudek, Jr.

(57) ABSTRACT

A processor applies a software hint policy to a portion of a cache based on access metrics for different test regions of the cache, wherein each test region applies a different software hint policy for data associated with cache entries in each region of the cache. One test region applies a software hint policy under which software hints are followed. The other test region applies a software hint policy under which software hints are ignored. One of the software hint policies is selected for application to a non-test region of the cache.

19 Claims, 8 Drawing Sheets

(56) References Cited

U.S. PATENT DOCUMENTS

| | | | | |
|---|---|---|---|---|
| 2009/0113135 A1* | 4/2009 | Cain | ............... | G06F 12/126 |
| | | | | 711/135 |
| 2010/0082904 A1* | 4/2010 | Juenemann | ......... | G06F 12/0868 |
| | | | | 711/119 |
| 2014/0281248 A1* | 9/2014 | Alameldeen | ........ | G06F 12/0864 |
| | | | | 711/128 |
| 2015/0286571 A1* | 10/2015 | Cain, III | ............. | G06F 12/0862 |
| | | | | 711/123 |
| 2015/0339234 A1* | 11/2015 | Karandikar | ......... | G06F 12/0888 |
| | | | | 711/137 |
| 2015/0378919 A1* | 12/2015 | Anantaraman | ..... | G06F 12/0862 |
| | | | | 711/122 |
| 2016/0357463 A1* | 12/2016 | DeNeui | ................ | G06F 3/0619 |
| 2017/0083441 A1* | 3/2017 | Cheng | ................ | G06F 12/0646 |
| 2017/0357588 A1* | 12/2017 | Moyer | ............... | G06F 12/0866 |

OTHER PUBLICATIONS

International Preliminary Report on Patentability dated Jun. 6, 2019 for International Application No. PCT/US2017/062944, 11 pages.

* cited by examiner

DYNAMIC APPLICATION OF SOFTWARE DATA CACHING HINTS BASED ON CACHE TEST REGIONS

BACKGROUND

To improve memory access efficiency, many processors employ a memory hierarchy, whereby a processor includes one or more caches to store a subset of data stored in main memory. The criteria for which subset of data from the main memory is stored in the cache and the conditions under which the data is stored can vary depending on the processor design, but typically prioritize the caching of data that has recently been accessed or that is predicted to be subsequently accessed within a threshold period of time. In addition, some processors employ one or more prefetchers that predict data that is likely to be accessed by the processor in the near future, and copy that data from main memory to the one or more caches. In an attempt to improve memory access efficiency, a compiler can insert one or more software hints into a set of instructions, wherein the software hints request the processor to prefetch specified data to a cache of the memory hierarchy, or request that the processor limit caching of specified data. However, in either case the hints are often based on inaccurate assumptions as to processor architecture or conditions, such that following the software hints can result in undesirably low memory access efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
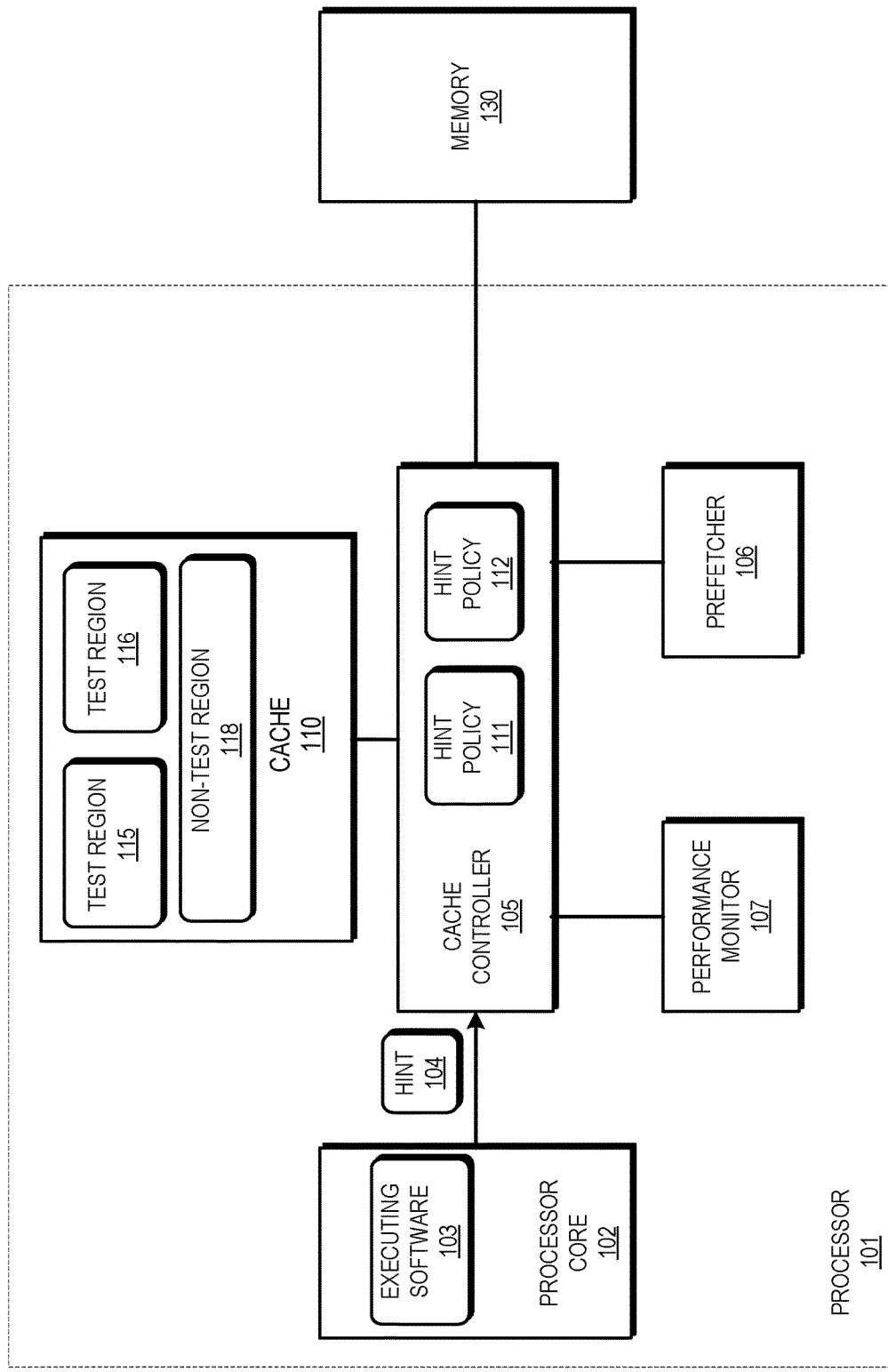
FIG. 1 is a block diagram of a processing system that applies a software hint policy to a portion of a cache based on access metrics for different test regions of the cache in accordance with some embodiments.

FIGS. 1-8 illustrate techniques for applying a software hint policy to a portion of a cache based on access metrics for different test regions of the cache, wherein each test region applies a different software hint policy for data associated with a software hint indicating when and how to cache the data. For example, in some embodiments one test region applies a software hint policy under which software hints associated with data are followed. Another test region applies a software hint policy under which software hints associated with data are ignored. The policy associated with better access metrics (e.g., cache hit rate) is applied to a non-test region of the cache. By selecting a software hint policy for the non-test portion of the cache based on access metrics for the different test regions, the cache dynamically changes the software hint policy to the more efficient policy for the pattern of instructions currently executing at a processor, thereby improving processing efficiency.

To illustrate via an example, in some embodiments the cache has two test regions and a non-test region, whereby all the regions are employed by the cache to store data in response to demand requests from a processor and in response to prefetch requests from a prefetcher. In addition, a cache controller receives demand requests and prefetch requests for data that are associated with software hints indicating when and how the data is to be stored in the cache. The cache controller employs different software hint policies for the different test regions, such that for one of the test regions the cache controller follows software hints associated with data. For the other test region, the cache controller ignores software hints associated with data. The processor monitors access metrics for each of the test regions, such as a cache hit rate, cache miss rate, or a combination thereof. Based on the access metrics, the processor selects the hint policy for one of the test regions and applies it to the non-test region of the cache. For example, if the cache hit rate is higher for one of the test regions, the processor applies the hint policy for that test region to the non-test region of the cache, thereby improving the hit rate for the cache overall.

As used herein, the terms "software hint policy" and "hint policy" refer to whether software hints associated with data are followed or ignored by the cache controller. The software hints are any hints that are explicit instructions or indicators in a set of instructions that request, but do not require, that a particular memory transfer take place, such as prefetching of data, or that data be treated by the memory hierarchy in a particular way, such as whether or how data should be cached or that a cache should be bypassed for the data. Thus, a software hint may be to prefetch data associated with the software hint to the cache based on a prediction that the data will be subsequently requested by the processor core within a threshold period of time. Another software hint may be to limit caching of data associated with the hint based on a prediction that the data will be subsequently requested by the processor core after a threshold period of time. Data that is predicted to be subsequently requested by the processor after a threshold period of time is referred to herein as "non-temporal data." For example, the software hint may be to bypass the cache when filling a memory access request for non-temporal data associated with the hint. As another example, the software hint may be to store non-temporal data associated with the hint at a designated entry of the cache. As another example, the software hint may be to assign an older age to the non-temporal data associated with the hint when storing the non-temporal data in the cache, such that the non-temporal data is more likely to be evicted from the cache under a least-recently-used (LRU) cache replacement policy.

Often, software hints indicating when and how data associated with the hints are to be cached are based on inaccurate predictions of processor behavior. For example, a software hint may be inserted by a compiler based a prediction of processor behavior for a particular processor configuration, but the prediction may be inaccurate if the processor configuration is modified. As another example, software hints for when and how to cache data may be inserted overly aggressively or too conservatively. By employing software hint policies of selectively following or ignoring software hints associated with data requested at test regions of the cache and measuring performance characteristics for the test regions, a software hint policy that optimizes performance characteristics can be selected and applied at the non-test region of the cache.

FIG. 1 illustrates a processing system 100 that applies a software hint policy for data associated with software hints to a portion of a cache based on access metrics for different test regions of the cache in accordance with some embodiments. The processing system 100 is generally configured to execute sets of instructions organized in the form of computer programs in order to carry out tasks on behalf of an electronic device. Accordingly, the processing system 100 may be used in any of a variety of electronic devices, such as a desktop or laptop computer, server, smartphone, tablet, game console, and the like.

To facilitate execution of instructions, the processing system 100 includes a processor 101 and memory 130. The processor 101 includes a processor core 102 configured to execute instructions from executing software 103, a cache controller 105, and a cache 110. In some embodiments, each of the modules of the processor 101 are formed on the same semiconductor die to form at least a portion of a processor core 102, and the memory 130 is formed on a different semiconductor die and connected to the processor 101 via one or more busses or signal lines. In some embodiments, at least a portion of the memory 130 is formed on the same semiconductor die as modules of the processor 101.

The cache 110 and the memory 130 are each memory devices generally configured to store data, and therefore may be random access memory (RAM) memory modules, non-volatile memory devices (e.g., flash memory), and the like. As described further herein, the cache 110 and the memory 130 form a memory hierarchy for the processing system 100. In addition, the memory hierarchy of the processing system 100 may include other memory modules, such as additional caches not illustrated in FIG. 1.

The processor core 102 includes an instruction pipeline having, for example, a fetch stage to fetch instructions, a decode stage to decode each fetched instruction into one or more operations, execution stages to execute the operations, and a retire stage to retire instructions whose operations have completed execution. One set of operations generated based on the instructions are referred to herein as memory access instructions, and are requests to load data (load operations) from the memory hierarchy of the processing system 100, and requests to store data (store operations) at the memory hierarchy of the processing system 100. Memory access requests generated by the processor core 102 represent requests to load or store data that are being used or are known to be needed by an executing software 103, and are referred to herein as demand requests.

The cache controller 105 is a module generally configured to manage the memory hierarchy of the processing system 100 by moving data between processor core 102, the cache 110 and the memory 130. In particular, the cache 110 is a memory device which includes a plurality of entries, whereby each entry is associated with one or more addresses of the memory 130. In response to a memory access request, the cache controller 105 reviews the data stored at one or more entries of the cache 110 to determine if any of the entries stores data associated with the memory address targeted by the memory access request. If so, the cache controller 105 indicates a cache hit and satisfies the memory access request at the identified entry, either by storing data at the entry (in the case of a store operation) or by providing the data at the identified entry to the processor core 102 (in the case of a load operation).

If data associated with the memory address is not stored at an entry of the cache 110, the cache controller 105 indicates a cache miss and issues a request to the memory 130 for the data at the memory address. Upon receipt of the data from the memory 130, the cache controller 105 stores the data at an entry of the cache 110, which in turn provides the data to the processor core 102, thus satisfying the memory access request.

To support improved memory access efficiency, the processor 101 includes a prefetcher 106 that monitors demand requests issued to the cache controller 105 to identify patterns and predict, based on the identified patterns, memory addresses that will be the target of demand requests by the processor core 102 in the near future. The prefetcher 106 issues to the cache controller 105 memory access requests, referred to herein as prefetch requests, targeting the identified memory addresses. The cache controller 105 treats a prefetch request similar to a demand request by first identifying if data associated with the memory address targeted by the prefetch request is already stored at an entry of the cache 110 and, if not already stored, requesting the data from the memory 130 and storing the data at an entry of the cache 110.

In some embodiments, each entry of the cache 110 is associated with a subset of memory addresses and only a unit of data (referred to as a cache line) associated with that subset is permitted to be stored at the entry. For example, in some embodiments the cache is an N-way set associative cache having M sets and each of the M sets including N entries. Each of the M sets is assigned a different subset of memory addresses, such that the cache controller 105 only stores data at an entry if the data is associated with a memory address in the entry's assigned subset.

To facilitate more efficient caching of data, a compiler may insert hints in executing software 103 indicating when and how data associated with the hints should be stored in the cache 110. Software hints may be based on assumptions regarding the configuration and operating conditions of the processor 101 and predictions of which data the processor core 102 will request in the course of executing the executing software 103. Depending on how closely the predictions match the actual requests issued by the processor core 102 when executing the executing software 103, following the software hints may improve or impair processing efficiency.

The cache controller 105 is configured to apply one or more software hint policies 111, 112 that govern how the cache controller 105 responds to software hints associated with data. For example, a software hint policy 111 mandates that the cache controller 105 follow software hints associated with data. Conversely, a different software hint policy 112 mandates that the cache controller 105 ignore software hints associated with data. Other software hint policies may mandate that the cache controller 105 follow software hints associated with data under certain circumstances.

In some embodiments, the cache controller 105 applies different software hint policies to different regions of the cache 110, wherein each region includes a plurality of entries. In at least one embodiment, each region only varies as to its hint policy. Thus, the entries of a region may be used for any set, and different regions may include different entries of the same set.

In the depicted example of FIG. 1, the cache 110 includes three regions: test regions 115 and 116 and non-test region 118. In addition, the cache controller 105 stores software hint policies 111 and 112 that differ in at least one aspect, such as whether software hints indicating when and how to fetch and store data at the cache 110 are followed or ignored. Thus, in the example of FIG. 1, the software hint policy 111 mandates following the software hints that indicate when to fetch and how to store data associated with the hints. For example, a software hint may be to prefetch data associated with the hint to the cache 110 based on a prediction that the data will be subsequently requested by the processor core 102 within a threshold period of time. Another software hint may be to limit caching of data associated with the hint based on a prediction that the data will be subsequently requested by the processor core 102 after a threshold period of time. For example, the software hint may be to bypass the cache 110 when filling a memory access request for data associated with the hint. As another example, the software hint may be to store data associated with the hint at a designated entry of the cache 110 based on a prediction that the data will be subsequently requested by the processor core 102 after a threshold period of time. As another example, the software hint may be to assign an older age to the data associated with the hint when storing the data in the cache 110, such that the data is more likely to be evicted from the cache 110 under an LRU cache replacement policy, based on a prediction that the data will be subsequently requested by the processor core 102 after a threshold period of time.

In contrast, the software hint policy 112 mandates that software hints indicating when to fetch and how to store data associated with the hints are ignored. The software hint policy 111 may therefore be more efficient for memory access patterns that more closely match predictions on which the software hints are based, and the software hint policy 112 may be more efficient for memory access patterns that differ from predictions on which the software hints are based. However, the memory access pattern for the processor core 102 may vary over time, such that the cache 110 operates more efficiently under different software hint policies at different times. Accordingly, for the non-test region 118, the cache controller 105 selects between the software hint policies 111 and 112 depending on performance characteristics of the test regions 115 and 116.

To illustrate, the processor 101 includes a performance monitor 107 that monitors and records performance characteristics, such as cache hit rate, cache miss rate, and the like, for each of the test regions 115 and 116. Based on one or more of the performance characteristics, or a combination thereof, of the test regions 115 and 116, the cache controller selects one of the software hint policies 111 and 112 and applies it to the non-test region 118. For example, if the cache hit rate for the test region 115 is higher than the cache hit rate for the test region 116, the cache controller 105 selects the software hint policy for the test region 115 (e.g., software hint policy 111) and applies it to the non-test region 118. In some embodiments, the non-test region 118 includes the majority of the entries of the cache 110. Thus, by selecting the software hint policy for the non-test region 118 as the more efficient software hint policy, as indicated by the performance of the test regions 115 and 116, the cache controller 105 enhances the overall efficiency of the cache 110. Further, as the performance characteristics of the test regions 115 and 116 change over time, the cache controller changes the software hint policy to the policy that is more efficient for a given set of performance characteristics.

Figure 2:
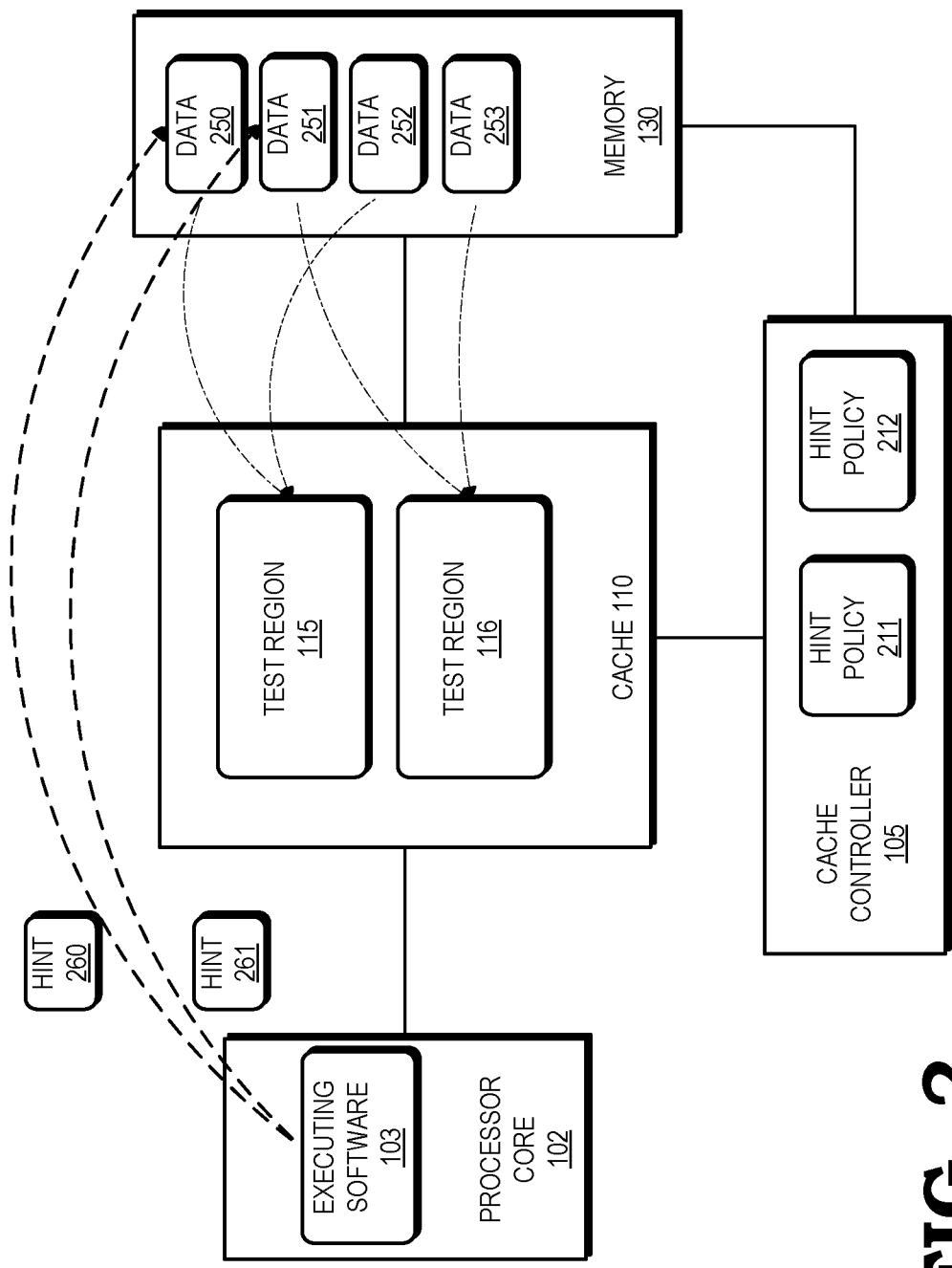
FIG. 2 is an example of the processing system of FIG. 1 employing different software hint policies in different test regions of the cache in accordance with some embodiments.

FIG. 2 illustrates an example of the cache controller 105 applying different software hint policies to the test regions 115 and 116 of the cache 110 of FIG. 1 in accordance with some embodiments. In the depicted example, each of the test regions 115 and 116 includes a plurality of entries (not shown), each of which is associated with an assigned subset of memory addresses (referred to as a "set"). Thus, data 250 and 252 are stored at memory addresses assigned to a set or sets within test region 115, and data 251 and 253 are stored at memory addresses assigned to a set or sets within test region 116. As used herein, data stored at a memory address in memory 130 that is assigned to a set in the cache 110 is referred to as being "associated with" the set.

The executing software 103 generates a software hint 260 associated with data 250 and a software hint 261 associated with data 251. The cache controller 105 applies hint policy 211 at test region 115 of the cache 110, and applies hint policy 212 at test region 116 of the cache 110. Hint policy 211 mandates that software hints are to be followed. Thus, the cache controller 105 follows software hint 260 associated with data 250, because data 250 is associated with test region 115 and the hint policy 211 that is applied at test region 115 mandates that software hints are to be followed by the cache controller 105. By contrast, hint policy 212 mandates that software hints are to be ignored. Thus, the cache controller 105 ignores software hint 261 associated with data 251, because data 251 is associated with test region 116 and the hint policy 212 that is applied at test region 116 mandates that software hints are to be ignored by the cache controller 105. Data that are not associated with software hints are fetched from memory 130 and stored at the cache 110 in accordance with demand requests issued by the processor core 102 and hardware prefetch requests issued by the prefetcher 106.

As described above, the cache controller 105 applies different software hint policies to the different test regions 115 and 116. By measuring the performance characteristics for each test region, the cache controller 105 identifies the more efficient software hint policy for a recent memory access pattern of the processor core 102, and applies the more efficient software hint policy to the non-test region 118 (not shown), thereby improving overall cache efficiency.

In some embodiments, instead of mandating following or ignoring all software hints associated with data, the software hint policy mandates following software hints associated with a portion of the data. For example, for the test region 115, the cache controller 105 applies a software hint policy pursuant to which software hints will be followed for only a percentage of entries associated with data associated with software hints.

Thus, the different software hint policies applied to the different test regions 115 and 116 vary in one or more of several aspects, including whether software hints will be followed for all, some, or none of the entries associated with data associated with software hints. Further, in some embodiments the cache 110 includes more than two test regions, with different software hint policies applied to each test region, thereby giving the cache controller a wide range of possible software hint policies to apply to the non-test region 118 (not shown).

Figure 3:
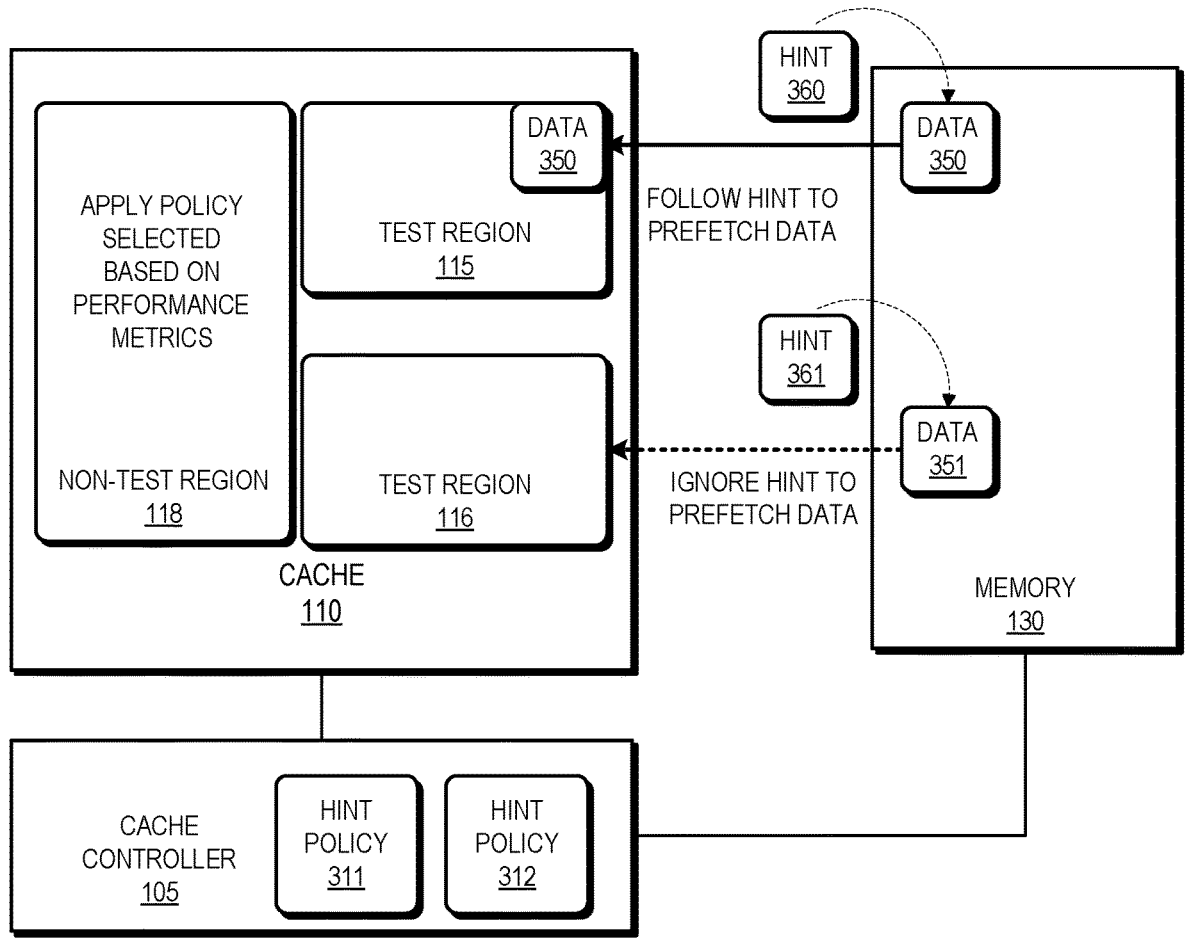
FIG. 3 is an example of the processing system of FIG. 1 employing different software hint policies in different test regions of the cache for software hints to prefetch data in accordance with some embodiments.

FIG. 3 illustrates an example of the cache controller 105 of FIG. 1 applying different software hint policies to different test regions of the cache 110 for software hints to prefetch data that is predicted to be requested by the processor core 102 within a threshold period of time from memory 130. In the example of FIG. 3, the cache controller 105 applies software hint policy 311 to test region 115 of the cache 110, and applies software hint policy 312 to test region 116 of the cache 110. Software hint policy 311 mandates that software hints associated with data at the test region 115 are to be followed. In the example of FIG. 3, software hints 360 and 361 associated with data 350 and 351, respectively, indicate that the cache controller 105 is to prefetch data 350 and 351 from memory 130 and store data 350 and 351 at the cache 110. Data 350 is associated with a set of entries in test region 115, and data 351 is associated with a set of entries in test region 116.

Cache controller 105 applies software hint policy 311 to test region 115, and therefore obeys the software hint 360 to prefetch data 350 from memory 130 and store data 350 at the associated set within test region 115 of the cache 110. By contrast, the cache controller 105 applies software hint policy 312 to test region 116 of the cache 110, and therefore ignores the software hint 361 to prefetch data 351 from memory 130 and store data 351 at the associated set within test region 116 of the cache 110.

As described above, the cache controller 105 applies different software hint policies for software prefetch hints to the different test regions 115 and 116. By measuring the performance characteristics for each test region, the cache controller 105 identifies the more efficient software hint policy for software prefetch hints for a recent memory access pattern of the processor core 102, and applies the more efficient software hint policy to the non-test region 118, thereby improving overall cache efficiency.

Figure 4:
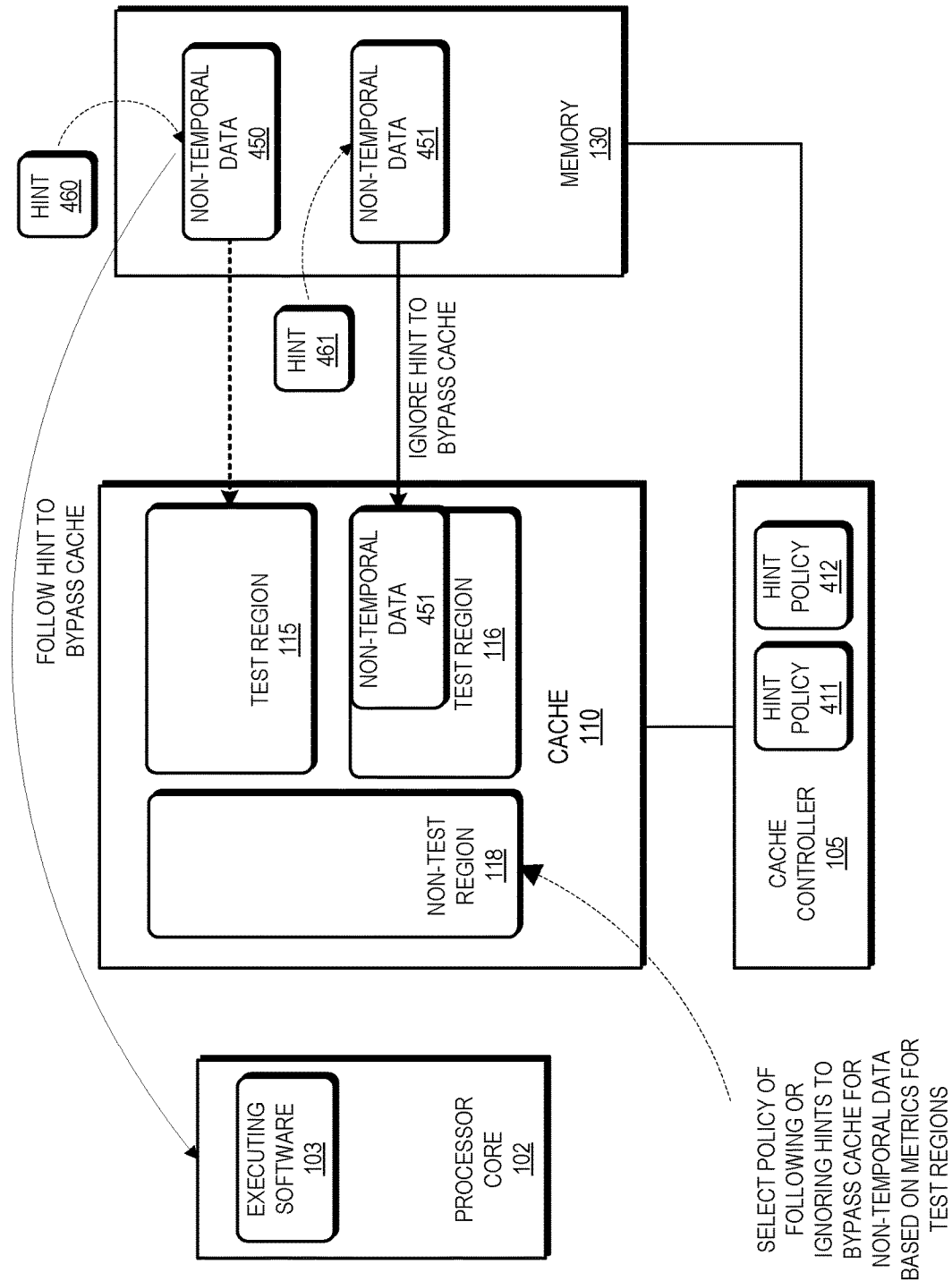
FIG. 4 is an example of the processing system of FIG. 1 employing different software hint policies in different test regions of the cache for software hints to bypass the cache when filling memory access requests for data that is predicted to be subsequently requested after a threshold period of time in accordance with some embodiments.

FIG. 4 illustrates an example of the cache controller 105 of FIG. 1 applying different software hint policies for software hints to bypass the cache 110 for non-temporal data to different test regions of the cache 110. If a requested cache line is not predicted to be subsequently requested within a threshold amount of time, it may not be advantageous to store the cache line in a cache. Accordingly, a compiler may insert a software hint instructing the cache controller 105 to bypass the cache 110 when filling a memory access request for non-temporal data. To bypass the cache 110, the cache controller 105 transfers the cache line that is the subject of the memory access request directly from the memory 130 to the processor core 102 or, in some embodiments, from the memory 130 to a cache at a lower level in the memory hierarchy (not shown), without installing the cache line in the cache 110.

In the example of FIG. 4, the cache controller 105 applies software hint policy 411 to test region 115 of the cache 110, and applies software hint policy 412 to test region 116 of the cache 110. Software hint policy 411 mandates that software hints are to be followed. Software hint policy 412 mandates that software hints are to be ignored. Software hints 460 and 461 associated with non-temporal data 450 and 451, respectively, indicate that the cache controller 105 is to bypass the cache 110 when filling a memory access request for non-temporal data 450 and 451. Non-temporal data 450 is associated with a set of entries in test region 115, and non-temporal data 451 is associated with a set of entries in test region 116.

Cache controller 105 applies software hint policy 411 to test region 115, and therefore obeys the software hint 460 to bypass the cache 110 when filling a memory access request for non-temporal data 450. By contrast, the cache controller 105 applies software hint policy 412 to test region 116 of the cache 110, and therefore ignores the software hint 461 to bypass the cache 110 when filling a memory access request for non-temporal data 451, and stores non-temporal data 451 at the associated set within test region 116 of the cache 110.

As described above, the cache controller 105 applies different software hint policies for software hints to bypass the cache 110 when filling memory access requests for non-temporal data to the different test regions 115 and 116. By measuring the performance characteristics for each test region, the cache controller 105 identifies the more efficient software hint policy for software hints to bypass the cache 110 when filling memory access requests for non-temporal data for a recent memory access pattern of the processor core 102, and applies the more efficient software hint policy to the non-test region 118, thereby improving overall cache efficiency.

Figure 5:
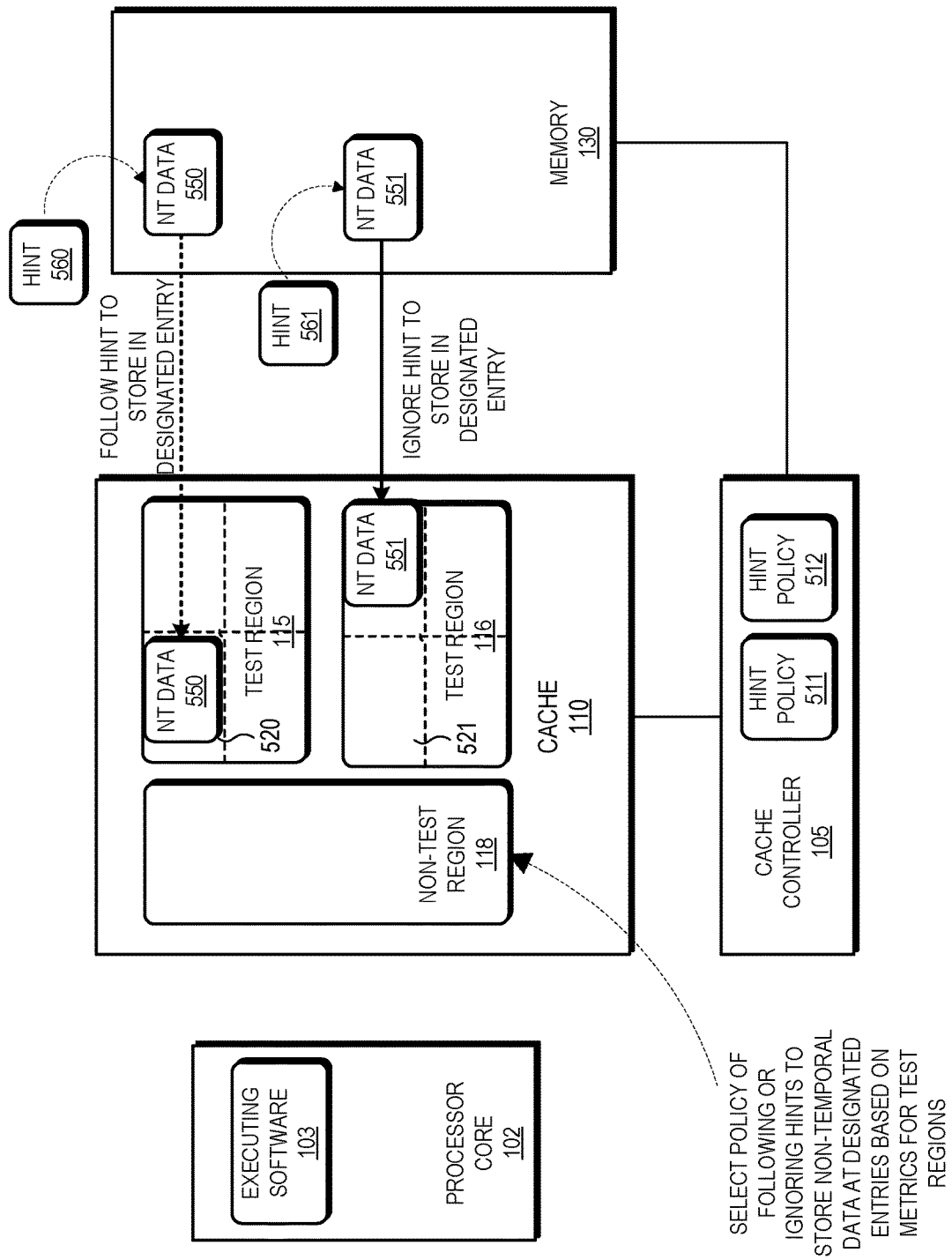
FIG. 5 is an example of the processing system of FIG. 1 employing different software hint policies in different test regions of the cache for software hints to store data that is predicted to be subsequently requested after a threshold period of time in designated cache entries in accordance with some embodiments.

FIG. 5 illustrates an example of the cache controller 105 of FIG. 1 applying different software hint policies for software hints to store non-temporal (NT) data at designated entries of the different test regions of the cache 110. When subsequent non-temporal data is fetched from the memory 130 and stored at the designated entry, the non-temporal data that was stored at the designated entry is evicted to make room for the incoming non-temporal data. By contrast, data that is predicted to be subsequently requested within a threshold period of time (referred to as temporal data) may be stored at a larger number of entries within an associated set of entries, such that the storage of additional temporal data may not result in the eviction of temporal data that was previously stored at the cache 110. Thus, temporal data may experience longer residency in the cache 110. By storing non-temporal data at designated entries of the cache 110, the non-temporal data may be retained for a shorter period of time in the cache 110 than it would if the non-temporal data were permitted to be stored at any available entry within the set of entries associated with the memory address of the non-temporal data.

In the example of FIG. 5, the cache controller 105 applies software hint policy 511 to test region 115 of the cache 110, and applies software hint policy 512 to test region 116 of the cache 110. Software hint policy 511 mandates that software hints are to be followed. Software hint policy 512 mandates that software hints are to be ignored. Software hints 560 and 561 associated with non-temporal data 550 and 551, respectively, indicate that the cache controller 105 is to store non-temporal data 550 and 551 at designated entries of the cache 110, rather than at entries within the sets of entries with which the non-temporal data 550 and 551 are associated. Test region 115 includes entry 520, which has been designated to store non-temporal data. Test region 116 includes entry 521, which has been designated to store non-temporal data. Non-temporal data 550 is associated with a set of entries in test region 115, and non-temporal data 551 is associated with a set of entries in test region 116.

Cache controller 105 applies software hint policy 511 to test region 115, and therefore obeys the software hint 560 to store non-temporal data 550 at the designated entry 520 within test region 115 of the cache 110. By contrast, the cache controller 105 applies software hint policy 512 to test region 116 of the cache 110, and therefore ignores the software hint 561 to store non-temporal data 551 at the designated entry 521 within test region 116, and stores non-temporal data 551 at a non-designated entry of the associated set within test region 116 of the cache 110.

As described above, the cache controller 105 applies different software hint policies for software hints to store non-temporal data at designated entries of the cache 110 to the different test regions 115 and 116. By measuring the performance characteristics for each test region, the cache controller 105 identifies the more efficient software hint policy for software hints to store non-temporal data at designated entries of the cache 110 for a recent memory access pattern of the processor core 102, and applies the more efficient software hint policy to the non-test region 118, thereby improving overall cache efficiency.

Figure 6:
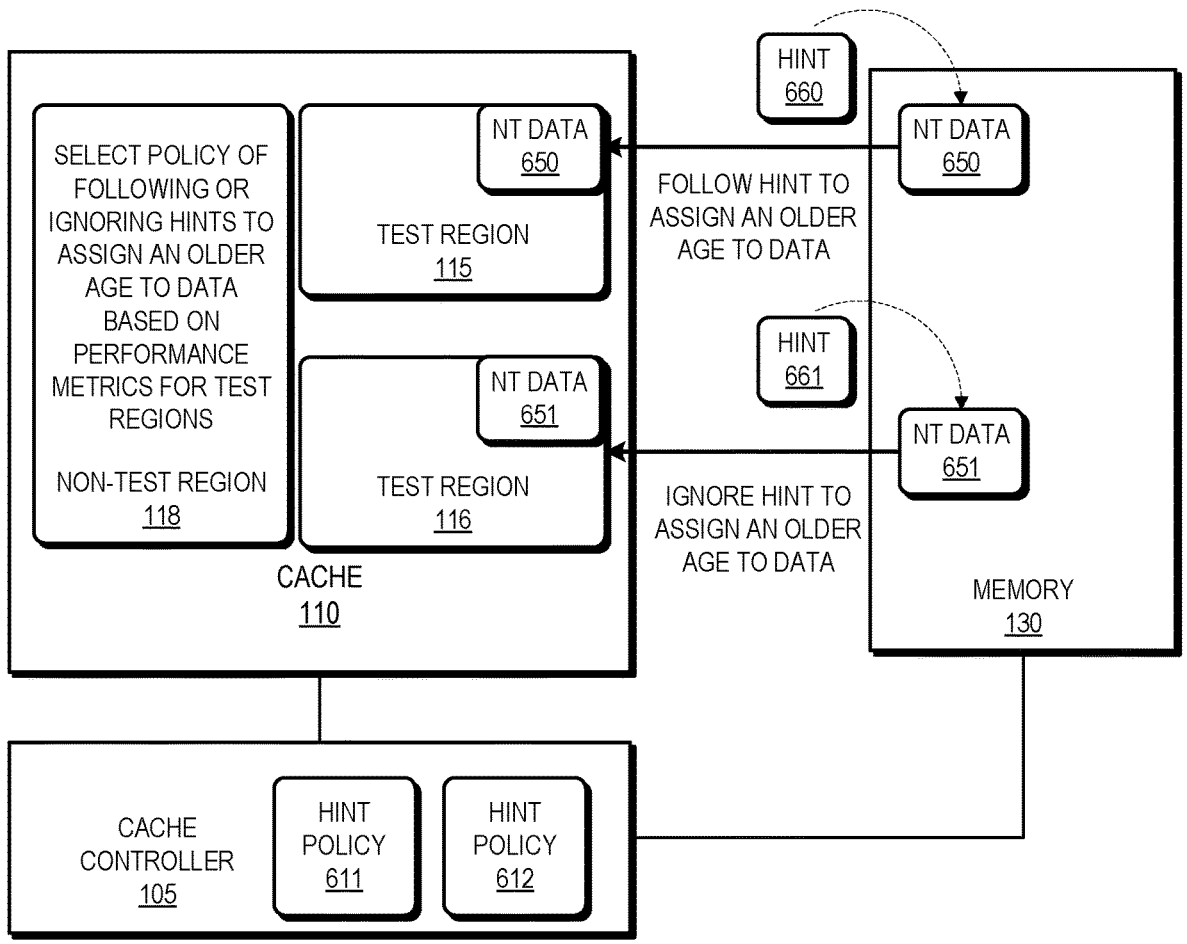
FIG. 6 is an example of the processing system of FIG. 1 employing different software hint policies in different test regions of the cache for software hints to assign an older age to data that is predicted to be subsequently requested after a threshold period of time in accordance with some embodiments.

In the example of FIG. 6, the cache controller 105 selects data for eviction from the cache 110 to make room for incoming data by selecting the least recently used data within the set associated with the incoming data. The executing software 103 issues software hints to limit caching of non-temporal data by assigning an older age to non-temporal data when it is stored in the cache 110. By assigning an older age to non-temporal data, the cache controller 105 increases the likelihood that the non-temporal data will be selected for eviction to make room for incoming data.

The cache controller 105 applies software hint policy 611 to test region 115 of the cache 110, and applies software hint policy 612 to test region 116 of the cache 110. The Software hint policy 611 mandates that software hints are to be followed. Software hint policy 612 mandates that software hints are to be ignored. Software hints 660 and 661 associated with non-temporal data 650 and 651, respectively, indicate that the cache controller 105 is to assign older ages to non-temporal data 650 and 651 when they are stored at the cache 110. Non-temporal data 650 is associated with a set of entries in test region 115, and non-temporal data 651 is associated with a set of entries in test region 116.

Cache controller 105 applies software hint policy 611 to test region 115, and therefore obeys the software hint 660 to assign an older age to non-temporal data 650 when it is stored at an entry within test region 115 of the cache 110. By contrast, the cache controller 105 applies software hint policy 612 to test region 116 of the cache 110, and therefore ignores the software hint 661 to assign an older age to non-temporal data 651 when it is stored at an entry within test region 116.

As described above, the cache controller 105 applies different software hint policies for software hints to assign older ages to non-temporal data when it is stored at entries within the different test regions 115 and 116. By measuring the performance characteristics for each test region, the cache controller 105 identifies the more efficient software hint policy for software hints to assign older ages to non-temporal data when it is stored at entries of the cache 110 for a recent memory access pattern of the processor core 102, and applies the more efficient software hint policy to the non-test region 118, thereby improving overall cache efficiency.

Figure 7:
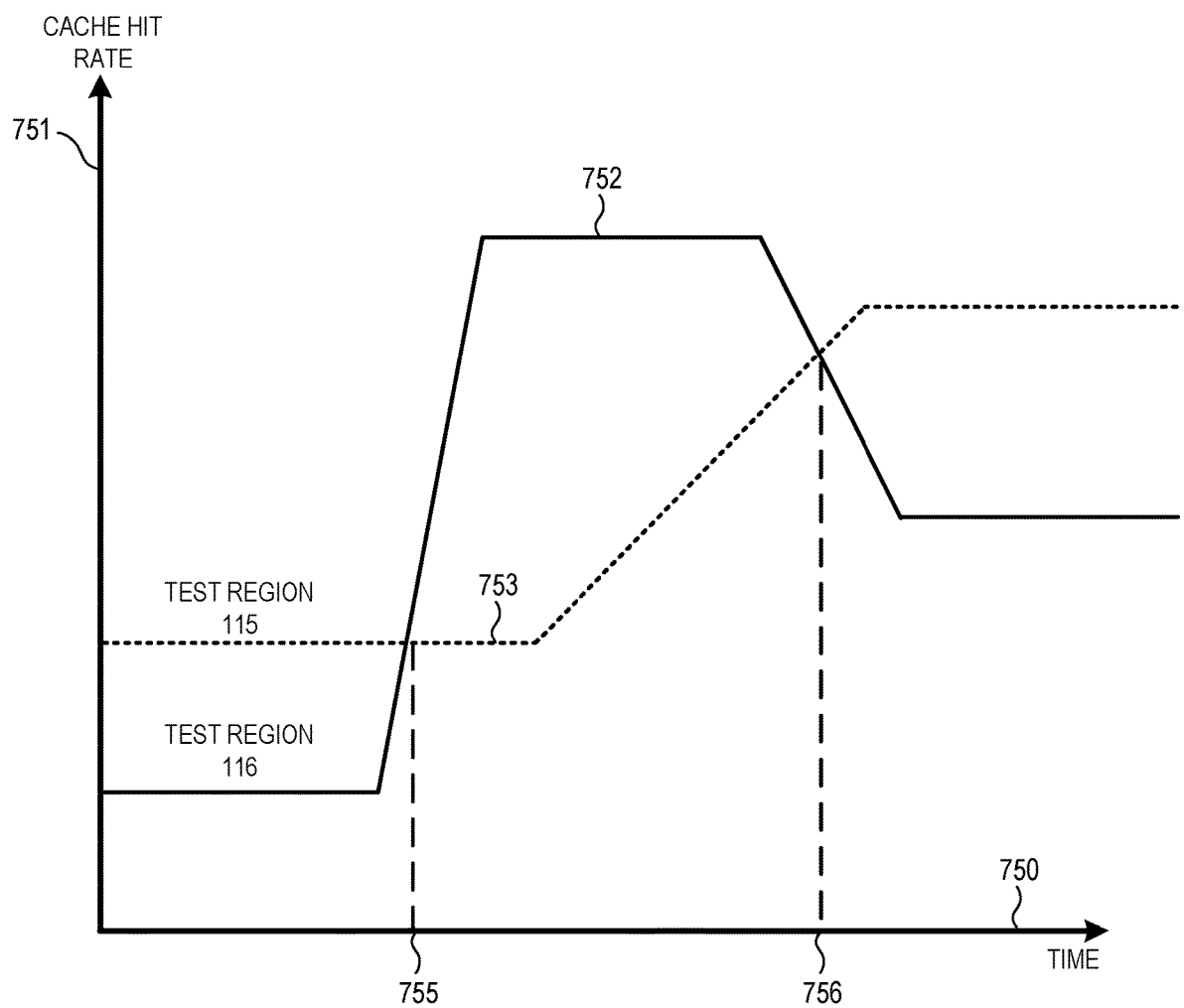
FIG. 7 is a diagram illustrating an example of the processing system of FIG. 1 changing the software hint policy at the non-test region of the cache based on access metrics for test regions of the cache in accordance with some embodiments.

FIG. 7 illustrates a diagram 700 depicting an example of the relative performance of the different test regions 115 and 116 changing over time in accordance with some embodiments. The diagram 700 includes an X-axis 750 representing time and a Y-axis 751 representing cache hit rate. The diagram 700 depicts a curve 752 representing the cache hit rate for the test region 116 over time and a curve 753 representing the cache hit rate for the test region 115.

In the example illustrated by the diagram 700, prior to a time 755 the cache hit rate 753 for the test region 115 is greater than the cache hit rate 752 for the test region 116. Accordingly, prior to time 755 the cache controller 105 applies the software hint policy for the test region 115 to the non-test region 118. At time 755, the relationship between the cache hit rates for the test regions 115 and 116 changes, such that the cache hit rate 752 for the test region 116 is greater than the cache hit rate 753 for the test region 115. In response, the cache controller 105 changes the software hint policy for the non-test region 118 to match the software hint policy for the test region 116. At a later time 756, the relationship between the cache hit rates for the test regions 115 and 116 again changes, such that the cache hit rate 753 for the test region 115 is again greater than the cache hit rate 752 for the test region 116. In response, the cache controller 105 changes the software hint policy for the non-test region 118 to match the software hint policy for the test region 115. Thus, the cache controller 105 changes the software hint policy applied to the non-test region 118 based on changes in the relative performance of the test regions 115 and 116.

Figure 8:
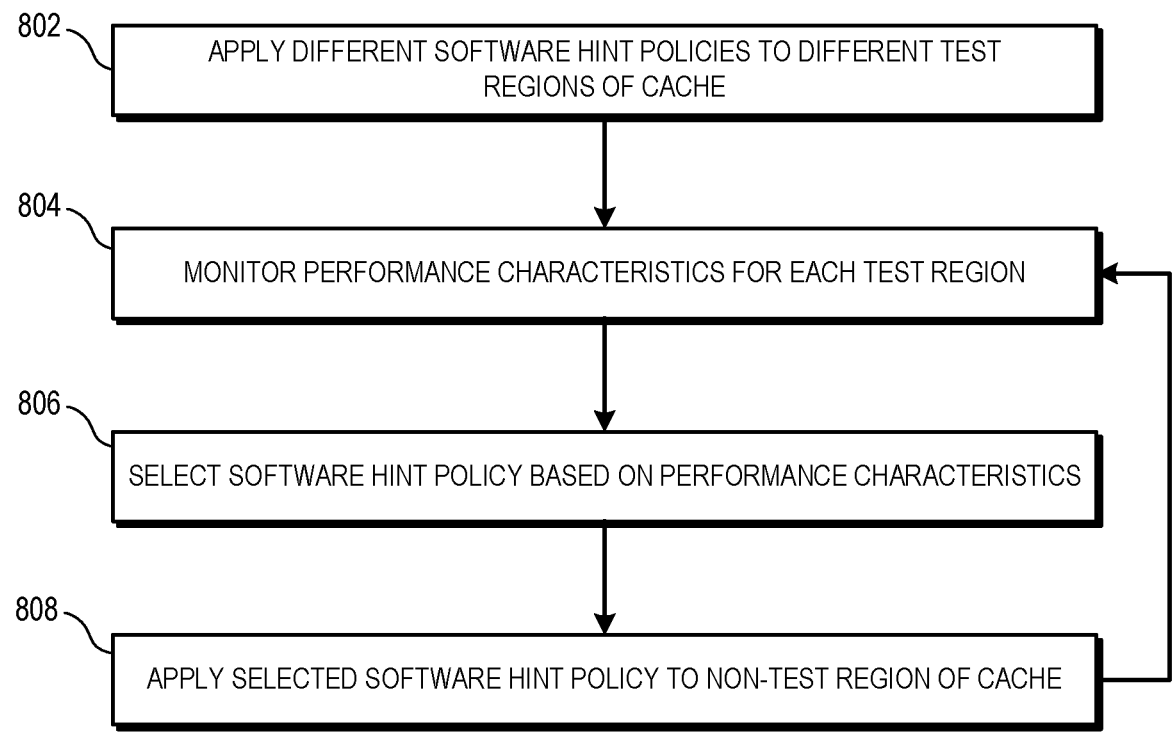
FIG. 8 is a flow diagram of a method of applying a software hint policy to a portion of a cache based on access metrics for different test regions of the cache in accordance with some embodiments.

FIG. 8 is a flow diagram of a method 800 of selecting a software hint policy for a non-test region of a cache based on performance characteristics of different test regions of the cache in accordance with some embodiments. For purposes of description, the method 800 is described with respect to an example implementation at the processing system 100 of FIG. 1. At block 802, the cache controller 105 applies the different software hint policies 111 and 112 to the different test regions 115 and 116 of the cache 110. Thus, for example, the cache controller 105 applies the software hint policy 111 to the test region 115 and the software hint policy 112 to the test region 116. At block 804, the performance monitor 104 monitors and records performance characteristics for the different test regions 115 and 116, such as cache hit rate, cache miss rate, a weighted sum of cache hit rate and cache miss rate, and the like.

At block 806, the cache controller 105 compares the performance characteristics for each of the test regions 115 and 116 and based on the comparison selects one of the software hint polices 111 and 112. For example, the cache controller 105 selects the software hint policy that is applied to the test region that has a higher performance as indicated by the performance characteristics. At block 808, the cache controller 105 applies the selected software hint policy to the non-test region 118 of the cache 110. That is, the cache controller follows or ignores software hints indicating when and how to store data at the non-test region 118 in keeping with the requirements of the selected software hint policy. The method flow returns to block 804, reflecting that the cache controller 105 continues to monitor the performance of the test regions 115 and 116 and based on the performance adjusts the software hint policy applied to the non-test region 118.

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium may include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    in response to receiving a first request for data associated with a first software hint at a first region of a cache, following the first software hint based on a first hint policy associated with the first region of the cache, the first software hint representing an explicit indicator in a set of instructions;
    in response to receiving a second request for data associated with a second software hint at a second region of the cache, ignoring the second software hint based on a second hint policy associated with the second region of the cache;
    measuring a first performance characteristic for the first region of the cache and a second performance characteristic for the second region of the cache;
    selecting one of the first hint policy and the second hint policy as a third hint policy for a third region of the cache based on the first performance characteristic and the second performance characteristic; and
    in response to receiving a third request for data associated with a third software hint at the third region of the cache, selectively following or ignoring the third software hint based on the third hint policy selected for the third region of the cache.

2. The method of claim 1, wherein at least one of the first, second, or third software hints is to prefetch data to the cache based on a prediction that the data will be subsequently requested within a threshold period of time.

3. The method of claim 1, wherein at least one of the first, second, or third software hints is to bypass the cache based on a prediction that the data will be subsequently requested after a threshold period of time.

4. The method of claim 1, wherein at least one of the first, second, or third software hints is to store data in a designated entry of the cache based on a prediction that the data will be subsequently requested after a threshold period of time.

5. The method of claim 1, wherein:
    data is selected for replacement from the cache based on an age of the data; and
    wherein at least one of the first, second, or third software hints is to assign an older age to data that is predicted to be subsequently requested after a threshold period of time.

6. The method of claim 1, wherein:
    the first performance characteristic comprises a cache hit rate at the first region of the cache; and
    the second performance characteristic comprises a cache hit rate at the second region of the cache.

7. The method of claim 1, wherein:
    the first performance characteristic comprises a cache miss rate at the first region of the cache; and
    the second performance characteristic comprises a cache miss rate at the second region of the cache.

8. The method of claim 1, wherein:
    the first performance characteristic comprises a first weighted sum of a cache hit rate at the first region of the cache and a cache miss rate at the first region of the cache; and
    the second performance characteristic comprises a second weighted sum of a cache hit rate at the second region of the cache and a cache miss rate at the second region of the cache.

9. A method, comprising:
    at a first region of a cache, applying a first hint policy of following a first software hint associated with a first request for data, the first software hint representing an explicit indicator in a set of instructions;
    at a second region of the cache, applying a second hint policy of ignoring a second software hint associated with a second request for data; and at a third region of the cache, selecting between the applying the first hint policy and the second hint policy based on performance characteristics for the first region and the second region.

10. The method of claim 9, wherein at least one of the first or second software hints is to prefetch data to the cache based on a prediction that the data will be subsequently requested within a threshold period of time.

11. The method of claim 9, wherein at least one of the first or second software hints is to bypass the cache based on a prediction that the data will be subsequently requested after a threshold period of time.

12. The method of claim 9, wherein at least one of the first or second software hints is to store data in a designated entry of the cache based on a prediction that the data will be subsequently requested after a threshold period of time.

13. The method of claim 9, wherein:
data is selected for replacement from the cache based on an age of the data; and
the at least one of the first or second software hints is to assign an older age to data that is predicted to be subsequently requested after a threshold period of time.

14. A processor, comprising:
a processor core;
a cache comprising a first region, a second region, and a third region;
a performance monitor to measure a first performance characteristic for the first region and a second performance characteristic for the second region; and
a cache controller configured to:
at the first region, apply a first hint policy of following a first software hint associated with a first request for data, the first software hint representing an explicit indicator in a set of instructions;
at the second region, apply a second hint policy of ignoring a second software hint associated with a second request for data; and
at the third region, apply a third hint policy of following or ignoring a third software hint based on the first performance characteristic and the second performance characteristic.

15. The processor of claim 14, wherein at least one or the first, second, or third software hints is to:
prefetch data to the cache based on a prediction that the data will be subsequently requested by the processor core within a threshold period of time.

16. The processor of claim 14, wherein at least one of the first, second, or third software hints is to:
bypass the cache based on a prediction that the data will be subsequently requested by the processor core after a threshold period of time.

17. The processor of claim 14, wherein at least one of the first, second, or third software hints is to:
store data at a designated cache entry based on a prediction that the data will be subsequently requested by the processor core after a threshold period of time.

18. The processor of claim 14, wherein:
the first performance characteristic comprises a cache hit rate at the first region; and
the second performance characteristic comprises a cache hit rate at the second region.

19. The processor of claim 14, wherein:
the first performance characteristic comprises a cache miss rate at the first region; and
the second performance characteristic comprises a cache miss rate at the second region.

* * * * *